(12) United States Patent
Magner et al.

(10) Patent No.: US 10,378,470 B2
(45) Date of Patent: Aug. 13, 2019

(54) METHOD AND SYSTEM FOR DIAGNOSING BOOST PRESSURE CONTROL

(71) Applicant: Ford Global Technologies, LLC, Dearborn, MI (US)

(72) Inventors: Stephen William Magner, Farmington Hills, MI (US); Michiel J. Van Nieuwstadt, Ann Arbor, MI (US); John Erik Mikael Hellstrom, Ann Arbor, MI (US); In Kwang Yoo, Ann Arbor, MI (US); Adarsh Appukuttan, Ann Arbor, MI (US); Jason Ronald Smith, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 150 days.

(21) Appl. No.: 15/620,457

(22) Filed: Jun. 12, 2017

(65) Prior Publication Data

US 2018/0355814 A1    Dec. 13, 2018

(51) Int. Cl.
| | |
|---|---|
| *F02D 41/22* | (2006.01) |
| *F02B 37/18* | (2006.01) |
| *F02B 37/24* | (2006.01) |
| *F02D 41/00* | (2006.01) |
| *F02D 41/14* | (2006.01) |

(52) U.S. Cl.
CPC ............ *F02D 41/221* (2013.01); *F02B 37/18* (2013.01); *F02B 37/24* (2013.01); *F02D 41/0007* (2013.01); *F02D 2041/1432* (2013.01); *F02D 2200/0406* (2013.01); *F02D 2200/0408* (2013.01)

(58) Field of Classification Search
CPC ............... F02D 41/221; F02D 41/0007; F02D 2200/0406; F02D 2200/0408; F02B 37/18; F02B 38/183; F02B 37/186; F02B 37/24
USPC ............................. 60/602, 605.1; 73/114.37
See application file for complete search history.

(56) References Cited

U.S. PATENT DOCUMENTS

| | | | |
|---|---|---|---|
| 6,253,551 B1 | 7/2001 | Lohmann et al. | |
| 6,457,461 B1 | 10/2002 | Romzek | |
| 7,484,367 B2 * | 2/2009 | Kishimoto | .......... F02D 41/0007 60/602 |
| 8,141,358 B2 * | 3/2012 | Kolmanovsky | ..... F02D 41/0007 60/605.1 |
| 8,601,811 B2 * | 12/2013 | Pursifull | ............. F02D 41/0007 60/602 |
| 8,991,243 B2 * | 3/2015 | Bleile | ................. F02D 41/0007 73/114.77 |
| 2012/0191319 A1 | 7/2012 | Kutoba et al. | |
| 2013/0067914 A1 * | 3/2013 | Malone | ................. F02D 41/221 60/602 |

(Continued)

FOREIGN PATENT DOCUMENTS

FR    2948415 A1 *  1/2011   ........... F02D 41/221

*Primary Examiner* — Thai Ba Trieu
(74) *Attorney, Agent, or Firm* — Julia Voutyras; McCoy Russell LLP

(57) ABSTRACT

Methods and systems are provided for providing passive boost pressure monitoring for slow response with higher confidence. A response time of a boost pressure feedback control loop following a boost pressure deviation that is triggered by either system disturbances or operator torque demand is monitored. Slow boost behavior is correlated with boost control degradation affecting drivability and emissions.

18 Claims, 7 Drawing Sheets

(56) References Cited

U.S. PATENT DOCUMENTS

| | | | |
|---|---|---|---|
| 2013/0067915 A1* | 3/2013 | Flynn | F02D 41/221 60/602 |
| 2014/0260241 A1* | 9/2014 | Jankovic | F02D 41/0007 60/602 |
| 2016/0290256 A1* | 10/2016 | Javaherian | F02D 41/0007 |
| 2017/0306824 A1* | 10/2017 | Yamashita | F02D 41/0007 |
| 2018/0119607 A1* | 5/2018 | Ono | F02D 41/0007 |
| 2018/0334954 A1* | 11/2018 | Banker | F02D 41/221 |

* cited by examiner

METHOD AND SYSTEM FOR DIAGNOSING BOOST PRESSURE CONTROL

FIELD

The present description relates generally to methods and systems for diagnosing slow boost pressure control in a boosted engine system.

BACKGROUND/SUMMARY

Engine systems may be configured with boosting devices, such as turbochargers, for providing a boosted air charge and improving peak power outputs. Turbochargers include a turbine in the engine's exhaust path that harnesses some of the available exhaust energy to drive an attached compressor, placed upstream of the engine that forces more flow through the intake manifold. As the turbine spins up, the exhaust pressure rises, reducing the outlet flow from the combustion process, until the compressor sufficiently boosts the intake manifold pressure to overcome the back pressure. The use of a compressor allows a smaller displacement engine to provide as much power as a larger displacement engine, but with additional fuel economy benefits.

Boost pressure may be controlled during engine operation so that the advantages of a boosted operation can be balanced against potential issues associated with too much or too little boost. For example, in a diesel engine, too little boost can result in excessive particulate matter (PM) formation and limited drivability. As another example, too much boost can result in noise vibration harshness (NVH) and limited use of exhaust gas recirculation (EGR) due to higher intake manifold pressures, where the reduction in inert exhaust gas usage results in higher combustion temperatures and increased exhaust NOx formation. In one example, boost pressure may be controlled by adjusting the geometry of a variable geometry turbine of the turbocharger, such as by varying a blade angle of a variable geometry turbine (VGT).

Boost pressure control systems may be periodically diagnosed, such as via the execution of an on-board diagnostic (OBD) monitor. The monitor is expected to provide a definitive fault/no fault status.

In regard to monitor methods, one example approach is shown by Romzek in U.S. Pat. No. 6,457,461. Therein, degradation in boost control via a VGT is inferred based on a difference between the magnitudes of an actual EGR flow rate related to an expected EGR flow rate during boosted engine operation, the expected EGR flow rate determined by modeling. Still other approaches rely on the output of one or more of a boost pressure sensor, a manifold pressure sensor, and a throttle position, for example.

However the inventors herein have identified potential issues with such approaches. As one example, the approaches rely on complex and computation intensive modeling. The required computation power may not be available in a resource limited vehicle system. As another example, the monitor may be intrusively run wherein a significant change in boost demand is deliberately generated and then the magnitude of the boost response is measured. The intrusive test stimulus may disrupt vehicle drivability and emissions. If the test is performed non-intrusively, where vehicle operation is not disrupted, the minimum conditions required to determine, with high confidence, that a fault is present may not be met. Overall, it may be difficult to provide both adequate detection and minimal disruption. As still another example, in each of the above approaches, irrespective of which sensor is used, the magnitude of change in sensor output, as well a rate of change in the sensor output, may be affected by vehicle driving conditions, such as whether the vehicle operator is mildly or severely accelerating the vehicle, frequency of application and shift between accelerator and brake pedal usage, etc. As a result, due to an error in modeling the expected output, there may be conditions where a significant difference between expected and actual sensor output is incorrectly attributed to a degraded boost response, or an insignificant difference is incorrectly associated with an un-degraded boost response.

The inventors herein have recognized that boost pressure control includes a feedback loop, and that the time taken by the feedback loop to respond to a pressure deviation may be leveraged as a monitor because the feedback must constantly correct for command changes and outside disturbances making the feedback sensitive to boost control response degradation. Specifically, instead of relying on carefully controlled open loop command and time-to-response tests which require intrusive operation, the feedback control response time can be learned in a non-intrusive manner, and used to assess boost control. Thus in one example, the issues described above may be addressed by a method for a boosted engine comprising, while operating an engine with closed-loop boost control, indicating degradation of a boost pressure control system based on a measured deviation between expected boost pressure and actual boost pressure that frequently occurs during a drive cycle, where the difference is large enough that the control response should be strongly elevated. A duration over which the deviation persists may be monitored. A slow response is determined is the duration is longer than a threshold duration. The slow response detected here may occur for various physical reasons, such as manifold leaks and/or slow actuation, so the detection is not limited to actuator only degradation. In this way, since both command changes and/or disturbances offer the opportunity to observe control error response, boost control may be diagnosed passively, as long as some check is made to confirm adequate drive stimulus has occurred because the monitor must eventually declare a fault/no fault condition for at least one third of all qualified drives. This method addresses a specific OBD requirement that the boost control system must not degrade in response time if the level of degradation could affect emissions results, and to set a malfunction indicator light (MIL) once certain regulatory procedures are executed by the PCM diagnostic system. Further, the slow boost response fault is not limited to any particular cause.

As one example, responsive to a change in operator torque demand, a desired boost pressure may be determined, and processed via application of each of a delay and lag filter that has a response time based on a time constant parameter. One or more boost actuators, such as an exhaust VGT or equivalent capability waste-gate, may be adjusted based on the desired boost pressure. For example, responsive to an increase in desired boost pressure, the waste-gate opening may be decreased. In parallel, a pressure deviation of the expected (filtered processed form of desired) boost pressure relative to the actual pressure may be checked for lying outside of a range defined by upper and lower boundaries. If qualifying vehicle operating conditions are also met, such as if a minimum vehicle run time has elapsed, a minimum manifold pressure is available, and a minimum engine temperature is maintained, an engine controller may track the response time of the boost pressure deviation outside of the allowed boundaries. That is, the controller may measure a duration elapsed when the expected and actual pressure differ enough to lie outside the upper or lower boundaries (for example, a duration over which the pressure deviation stays above a threshold deviation level). A disturbance that altered the boost pressure, though the command was fixed, also results in a deviation error that can be evaluated the same way. The qualifying vehicle operating conditions as well as the upper and lower bounds of the pressure deviation may ensure that departing from the boundary conditions are confirmed where the response time can be reliably used for assessing the boost pressure control system response time. If the measured response time is higher than a threshold duration, such as higher than a known nominal system's maximum response time for qualified conditions, the controller may infer boost degradation to inform both the required regulatory OBD monitor and alert the operator of degraded operation.

In this way, by evaluating the response time of a boost control system to a pressure deviation, not specifically dependent on the command or position of the boost actuators (such as waste-gate), boost pressure response degradation may be separated from normal response that was intended to be slow. Requiring that the deviation exceed a boundary ensures that an elevated control response occurs that should trigger a fast correction (and if not fast is likely a fault) and the purpose of using defined upper and lower boundaries is that differences in response time to boost pressure overshoot versus undershoot may be better accounted for since the control system may be tuned to react to these differently, reducing the likelihood of erroneous faulted or un-faulted indications. By confirming qualifying vehicle operating conditions, the response time can be compared only during conditions where the results are reliable. In particular, idle and near-idle operating conditions can be avoided, where response times are unreliable. By confirming that operating conditions match those of a complete test run, the results of the boost monitor can be relied on with a higher confidence factor. By performing the test non-intrusively, adequate detection can be provided without disrupting vehicle drivability and emissions. In addition, the monitor may be run without necessitating complex and computation intensive modeling. Overall, boost control may be better diagnosed and timely addressed, improving boosted engine performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
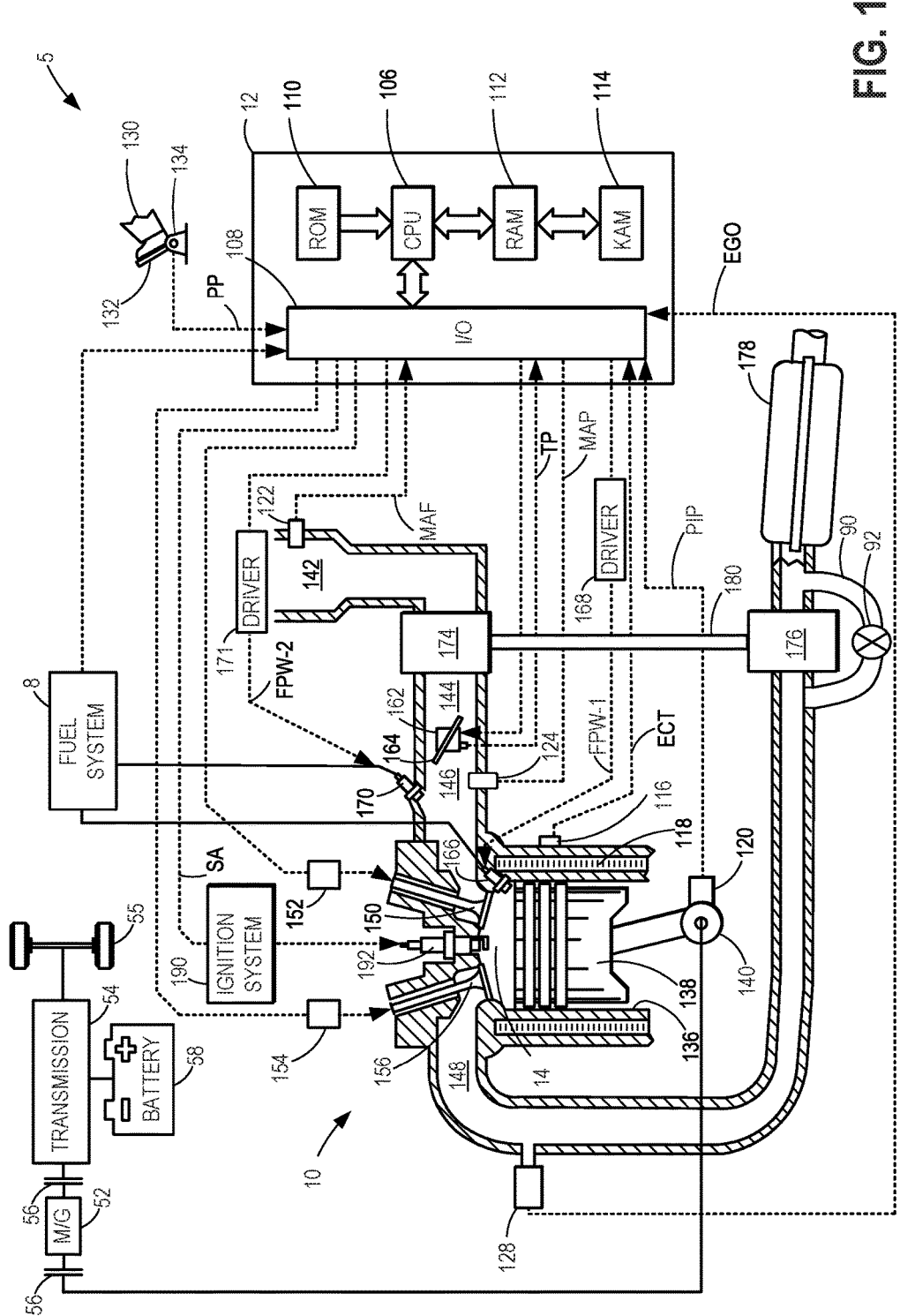
FIG. 1 shows an example boosted engine system.

The following description relates to systems and methods for diagnosing a boost control system in a boosted engine system, such as the engine system of FIG. 1. An engine controller may be configured to perform a control routine, such as the example routine of FIGS. 2A-2B, to diagnose boost control capabilities based on a feedback response time to a boost pressure deviation. The response time may be monitored upon confirming that qualifying operating conditions are present, such as those elaborated at FIG. 3, to better account for response time deviations resulting for pressure overshoot, undershoot, or engine idling conditions. An example variation in desired, expected, and actual boost pressure in an un-faulted boosted engine system is shown at FIG. 4. A prophetic example of boost pressure diagnosis is shown with reference to FIGS. 5 and 6. In this way, boosted engine performance is monitored and systemic failure of boost response control can be diagnosed.

FIG. 1 depicts an example of a combustion chamber or cylinder of internal combustion engine 10 coupled in vehicle 5. In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust is directed to turbine 176 to drive the turbine. When reduced turbine torque is desired, some exhaust may be directed instead through bypass passage 90, by-passing the turbine 176. Waste-gate valve 92 may be actuated open to dump at least some exhaust pressure from upstream of the turbine to a location downstream of the turbine via bypass passage 90. By reducing exhaust pressure upstream of the turbine 176, turbine speed can be reduced, thereby reducing boost pressure delivered by compressor 174. In still other examples, where turbine 176 is a variable geometry turbine (VGT), boost pressure may be increased or decreased by adjusting a geometry of the turbine (e.g., angle of the blades of the VGT).

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

The controller 12 receives signals from the various sensors of FIG. 1 and employs the various actuators of FIG. 1 to adjust engine operation based on the received signals and instructions stored on a memory of the controller. For example, responsive to an increase in operator torque demand as indicated based on input from a pedal position sensor (during a tip-in event), the controller may increase boost pressure output by the engine by sending a control signal to the waste-gate valve actuator to actuate the waste-gate valve to a more closed position. As another example, responsive to a decrease in operator torque demand as indicated based on input from a pedal position sensor (during a tip-out event), the controller may increase boost pressure output by the engine by sending a control signal to the waste-gate valve actuator to actuate the waste-gate valve to a more closed position. In one example, the boost pressure may be controlled via a boost control module of the controller.

By using a turbocharger, a power output of the engine for a given cylinder displacement may be increased. Additional synergistic benefits are also achieved. The turbocharger turbine in the engine's exhaust path harnesses some of the available exhaust energy to drive the attached compressor that forces more flow through the intake manifold. As the turbine spins up, the exhaust pressure rises, reducing the outlet flow from the combustion process, until the compressor sufficiently "boosts" the intake manifold pressure to overcome the back pressure.

However, the advantages of a turbocharged system must be balanced against several detractions that grow as the boost reaches a high level. For example, in a diesel engine, too little boost results in excessive particulate formation and limited drivability, while too much boost creates noise, vibration, and harshness (NVH) and limits exhaust gas recirculation (EGR) due to higher intake manifold pressures. The reduction in inert exhaust gas can result in higher combustion temperatures and promotes NOx formation. Such a boosted engine system may require careful orchestration of trade-offs to deliver required engine power and yet limit boost pressure to avoid prolonged combustion at high boost pressure that increases exhaust emissions.

As discussed earlier, turbocharger operation may be controlled via adjustments to components or actuators of a boost control system, such as by relieving exhaust pressure by either bypassing the turbine blades (such as via bypass passage 90) or by altering the turbine's geometry, such as the angle of its blades, to vary its capture of exhaust energy. The turbocharger engine design results in an upstream air flow and injected fuel that typically produces excessive boost pressure, unless the VGT or other highly capable waste gate is used to manage the boost level. The tradeoff is determined by mapping the engine and scheduling an acceptable boost pressure. Other engine systems, such as exhaust gas recirculation (EGR) and variable cam timing (VCT) can interfere with the boost pressure. These other factors are scheduled as well, but transient operation and/or steady-state offsets can result in boost pressures that deviate from the desired level. One example approach for rejecting these disturbances includes assigning the VGT to a closed-loop regulation to maintain the desired boost pressure. The boost pressure closed loop response is dominated by the manifold filling dynamics which are much slower than the VGT actuation. Typically the VGT actuator responds to a commanded correction in several hundred milliseconds but the overall feedback system may take several seconds to reject a disturbance.

To enable regulated exhaust emissions, an on-board diagnostics (OBD) monitor may attempt a test for each vehicle drive or "trip" that meets a minimum set of criteria (such as a minimum vehicle run time at 0 vehicle speed as well as over 25 mph, acceptable ambient temperatures and pressures, etc.). The OBD test must conclude that the boosted engine system is un-faulted or faulted for at least one third of all valid drives. One example OBD test may be specifically addressed to the boost pressure control system, allowing for the possibility of control actuators such as the VGT to create a slow boost pressure control fault for fault monitor verification. Intrusive OBD tests may deliberately exercise the boost pressure control system to check for the capability of a response to an intrusively created pressure deviation for the sole purpose of satisfying the OBD test. One advantage of the intrusive system is that the vehicle's control system can actively pursue opportunities to reveal a possible fault and if no fault is found declare the vehicle fault free for the drive in question and satisfy the drive test completion metric. However, the test stimulus of the intrusive test may have the potential to disrupt the vehicles drivability and emissions, so the intrusive approach can be challenging to produce both adequate detection and minimal disruption.

OBD test requirements may also be met via a passive detection. Rather than deliberately stimulate the system's actuators to reveal a fault, the control system may observe the normal behavior of the boost control system, looking for evidence indicating that the system is faulted. The minimum conditions required to qualify a drive as a valid test case may not always provide a particular OBD test sufficient actuator operation to reliably differentiate an un-faulted result from a faulted result with high confidence, creating a significant challenge. The benefit of a passive test is that the nominal system does not have to risk disruption from deliberate intrusive operation.

As elaborated herein, a passive (non-intrusive) approach may be used for meeting the OBD test requirements while providing reliable results. As described with reference to FIG. 2, an engine controller may evaluate the performance of the boost control system's feedback response while focusing on the transient difference or deviation in desired and actual boost pressure instead of focusing on the nature or magnitude of the actuator adjustment (e.g., independent of a waste-gate command or measured position).

In this way, the components of FIG. 1 may enable a vehicle system, comprising an engine; a turbocharger including an intake compressor driven by an exhaust turbine; a VGT or waste-gate valve positioned in a waste-gate coupled across the exhaust turbine; a timer; and a controller with computer-readable instructions stored on non-transitory memory for: responsive to a change in demanded boost pressure, adjusting a position of the waste-gate valve and initiating the timer; monitoring a duration elapsed on the timer to complete a pressure deviation corresponding to the change in demanded boost pressure following the adjusting; and in response to the duration being larger than a threshold, indicating degradation of intake boost pressure response time. The controller may include further instructions for monitoring the duration responsive to qualifying vehicle operating conditions being met including a minimum vehicle run time, a threshold engine temperature estimated via an engine temperature sensor, a minimum manifold pressure level estimated by an intake manifold pressure sensor, and a minimum rate of change of injected fuel mass commanded to an engine cylinder fuel injector. The controller may include still further instructions for processing the desired pressure via each of a delay and a lag filter with a TC parameter to form an expected boost pressure so that a pressure deviation signal can be formed by taking the difference between expected and actual; and checking the pressure deviation between each of an upper limit and a lower limit, the upper limit based on tolerance of nominal undershoot, the lower limit based on tolerance of nominal overshoot. In either an under or overshoot condition, once the deviation departs from the boundaries the feedback will drive a sufficient strong control response to correct the deviation, allowing the monitor to see a potential faulted slow response. Note, control systems tend to back off on control effort as the target is approached and the response will tend to slow down, to achieve smoother operation, so as not exceed even a faulted system response capability, thus a minimum deviation outside the boundaries is needed.

Figure 2A:
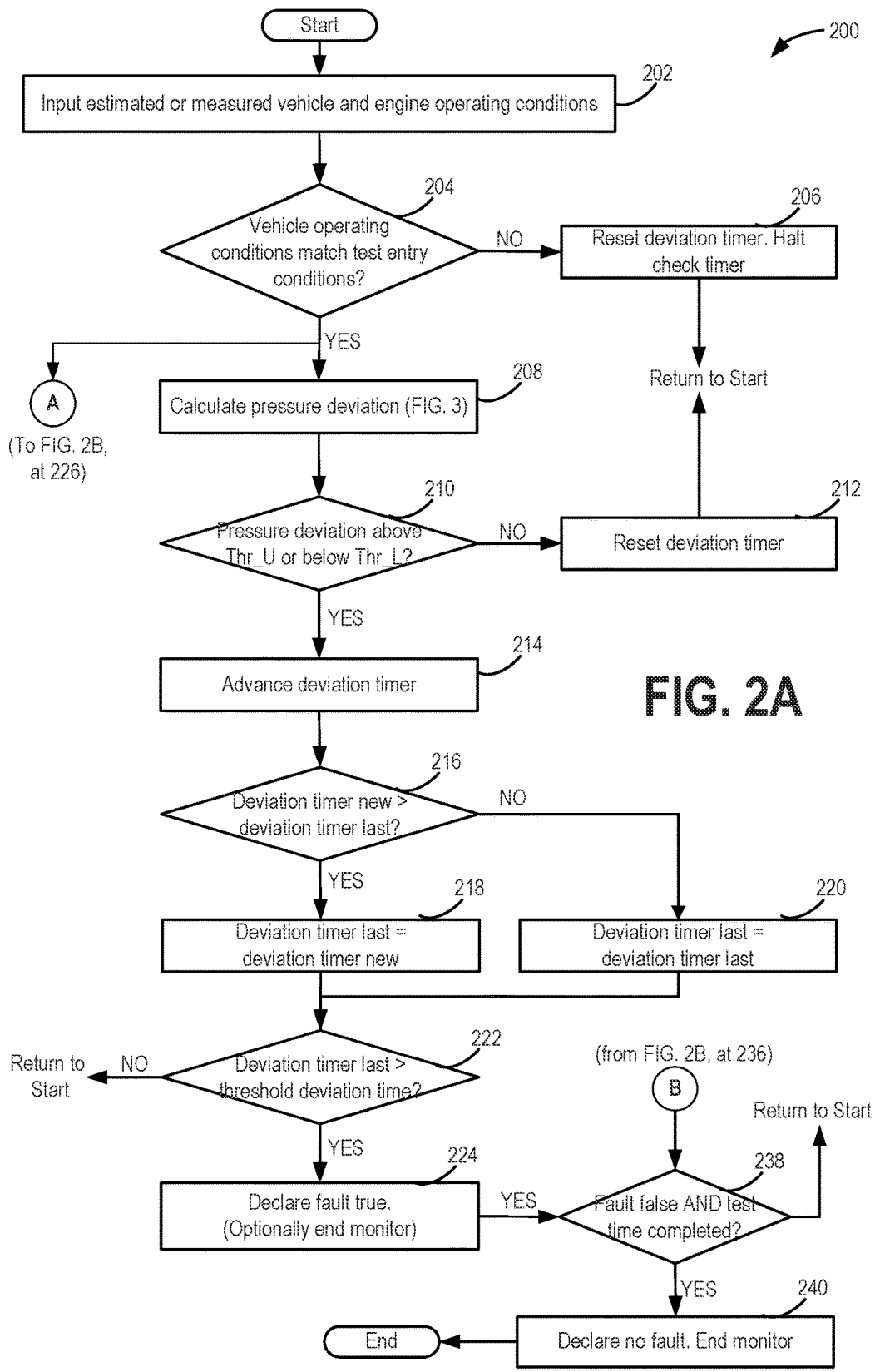
FIGS. 2A-2B depict a high-level flowchart of an example method for diagnosing boost pressure control system degradation based on feedback control response time and evaluation of adequate stimulus to reveal a potential fault.
Figure 2B:
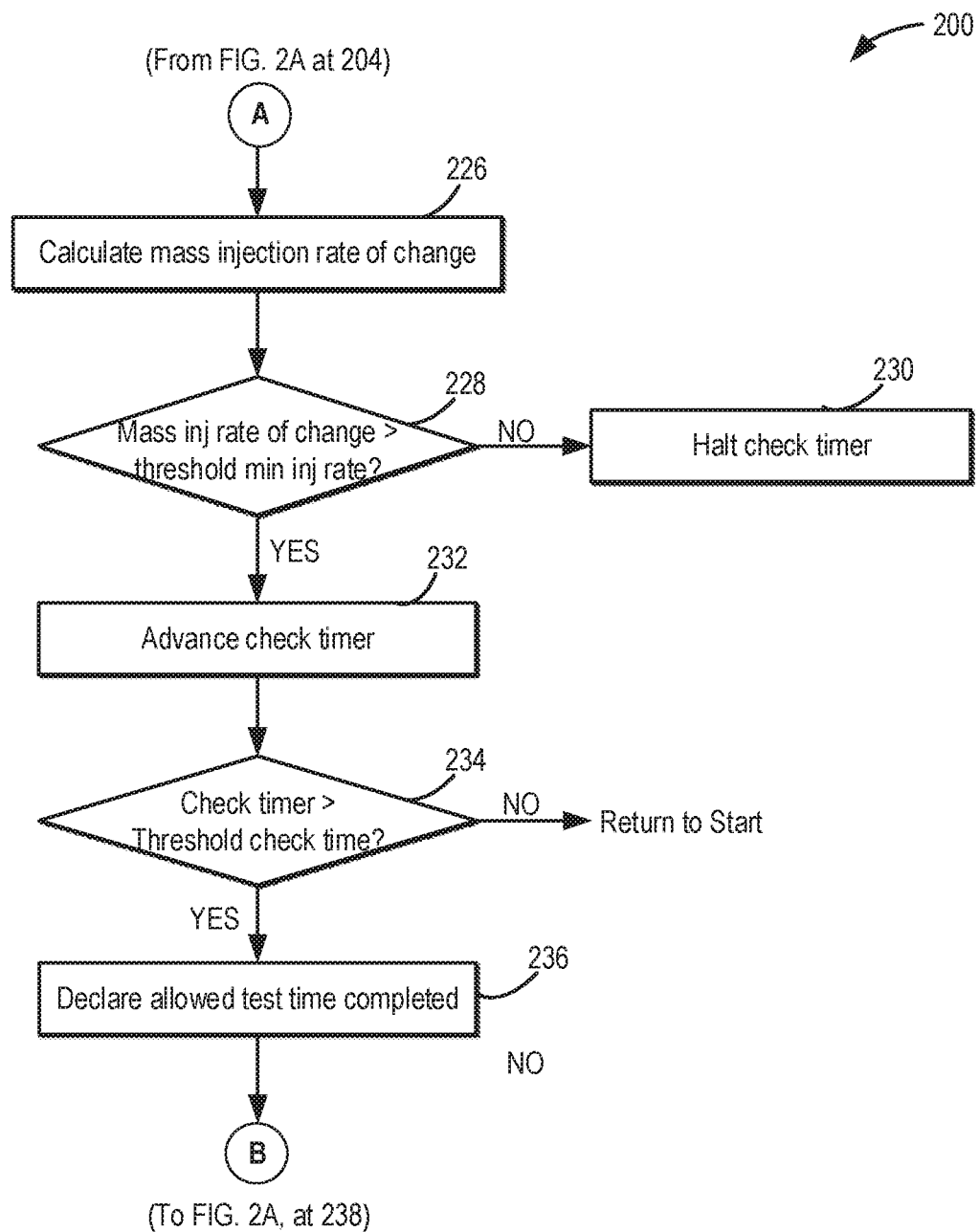

Turning now to FIGS. 2A-2B, an example method 200 is shown for diagnosing the response of a boost pressure control system, including checking for adequate stimulus needed to reveal a fault. The method enables boost pressure control to be diagnosed non-intrusively based on a response time of a boost pressure feedback loop responding to different boost pressure deviations over the course of a drive cycle. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below. It will be appreciated that FIG. 2B is a continuation of method 200 of FIG. 2A and that method 300 of FIG. 3 details aspects of step 208 of FIG. 2A.

At 202, the method inputs estimated and/or measured vehicle and engine operating conditions collected by the engine. These may include, as non-limiting examples, engine speed, vehicle speed, engine temperature, ambient conditions such as ambient temperature, barometric pressure, and ambient humidity, fuel injection mass, measured boost pressure, engine run time since a last engine start, EGR flow rate, current boost pressure, current waste-gate valve position, manifold flow and pressure, exhaust temperature, etc. As such, the engine may be operating with closed-loop boost control during the routine of FIGS. 2A-2B.

At 204, the method checks a subset of the input PCM collected conditions, such as minimum run time, minimum engine coolant temperature, and minimum intake manifold pressure, to determine if the vehicle operating conditions match the entry conditions for the boost monitor. The minimum run time, for one example may be 25 seconds, ensures that the vehicles subsystems have completed initialization for the drive, allowing normal boost control to commence. The minimum engine coolant temperature, in one example 44 degrees C., ensures that the engine components related to intake manifold and boost control are sufficiently warm for normal operation. The minimum intake manifold pressure, in one example 1500 hPA, is large enough to ensure that the engine is not idling or in a large deceleration where the expected boost estimate may not be sufficiently accurate. If any of the entry conditions checked for are not satisfied, then at 206, a pressure deviation timer is reset, a check timer is halted and left at its current level, and the monitor waits to try again when the PCM execution returns on the next execution pass. If all the entry conditions are matched then the method can continue on to 208 and 226, concurrently. Details of the sub-routine starting at 226 are depicted at FIG. 2B which is a continuation of FIG. 2A. The method 200 requires that the PCM on a given pass execute both paths (the path starting at 208 as well as the path starting at 226) as far as conditions allow, and then try again on the next pass. Thus FIGS. 2A-2B show the method returning to start if conditions are blocked (when the response to a query is "NO").

It will be appreciated that in some examples, the monitor of FIGS. 2A-2B may be initiated or triggered responsive to a change in operator torque demand, such as a higher than threshold change in operator torque demand necessitating a change in boost pressure delivery. In one example, a change in operator torque demand may be confirmed if the operator depresses or releases an accelerator pedal by more than a threshold amount. If a change in operator torque demand is not confirmed, or if the change is less than the threshold change and does not necessitate a change in boost pressure delivery, the monitor may not be triggered and boost actuator settings, such as a waste gate position or a turbine geometry (e.g., angle of turbine blades) may be maintained. A sub-module of the PCM may be configured to determine the desired boost pressure as operator torque demand changes, the sub-module responsible for boost pressure determination distinct from a sub-module of the PCM that is responsible for executing the monitor of FIGS. 2A-2B.

Figure 3:
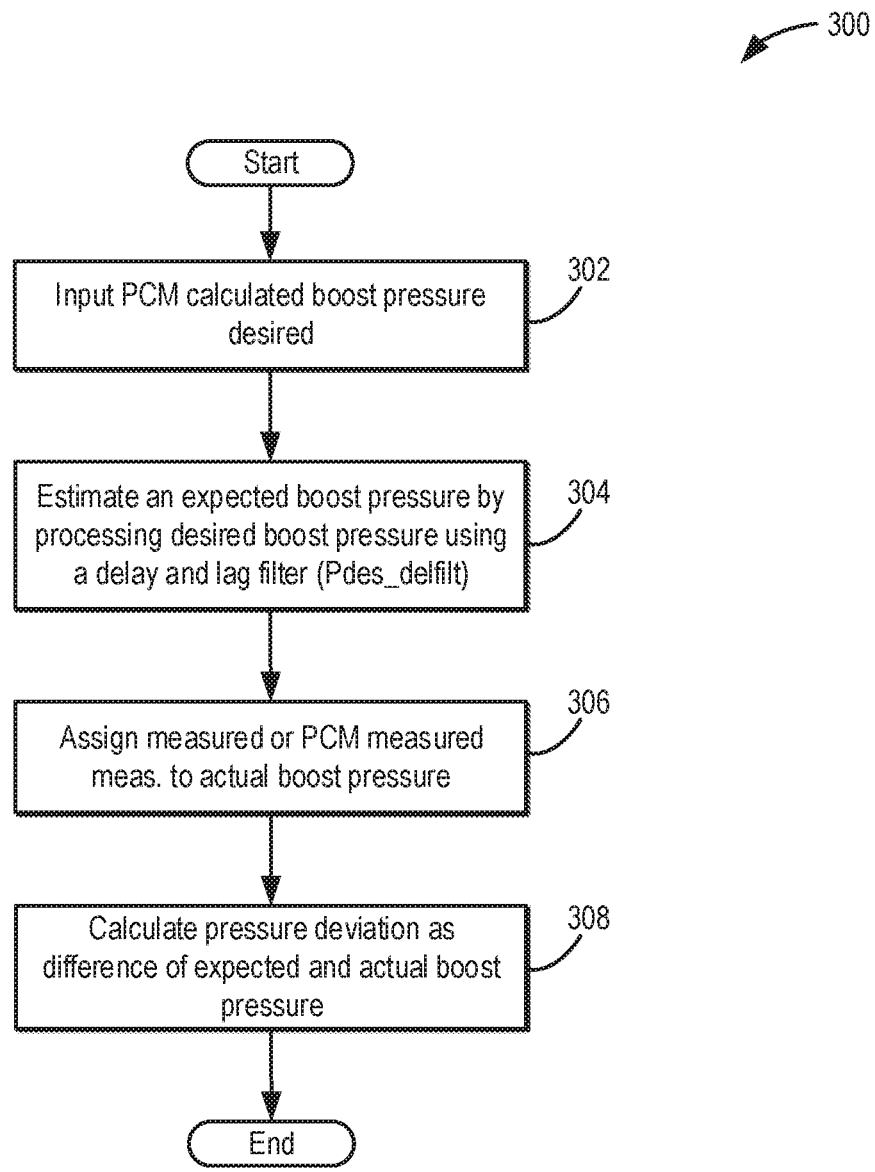
FIG. 3 depicts a high-level flowchart of an example method for determining the pressure deviation of the boost pressure control.
Figure 4:
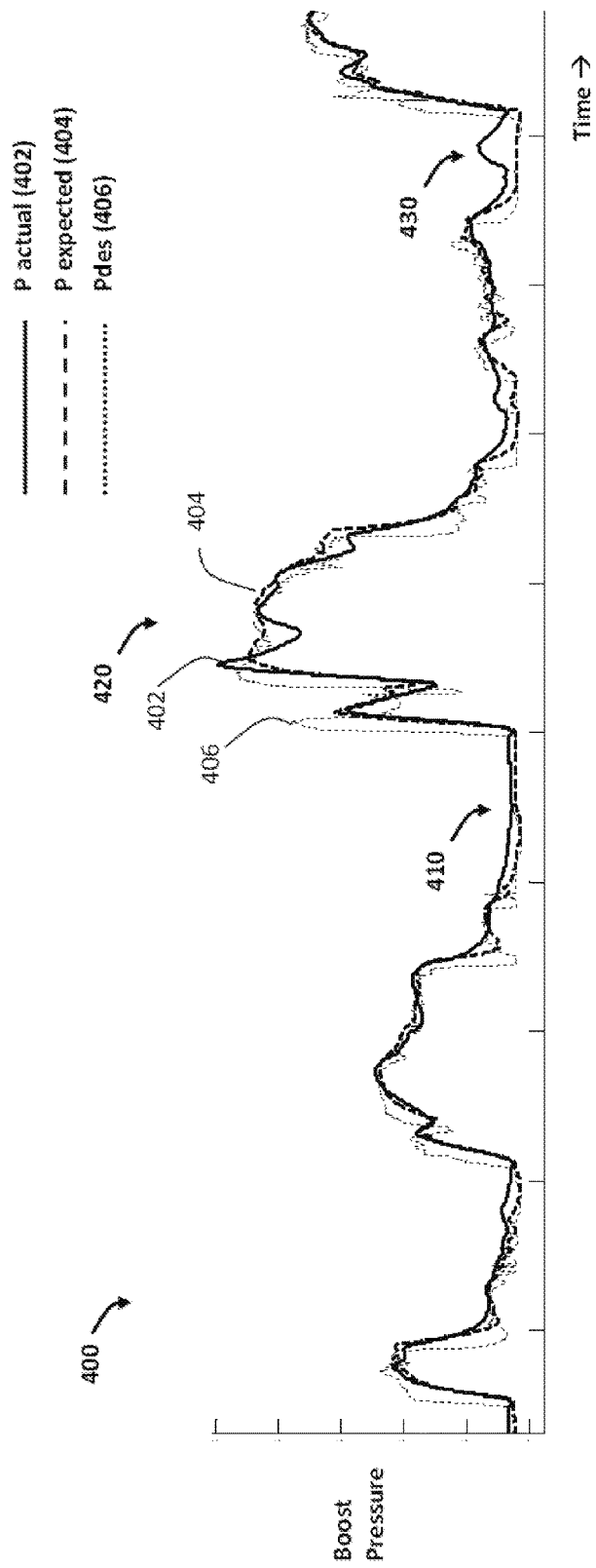
FIG. 4 depicts relevant boost pressure signals used to determine pressure deviation.

Returning to 208, the pressure deviation is calculated and this is detailed in FIG. 3. At 210, the pressure deviation is compared against an upper (Thr_U) and a lower (Thr_L) set of boundaries that define a range in which the pressure deviation is considered to be within a nominal system's range. As such, different pressure deviations may have different impacts on the boost control system's feedback response time and performance. In particular, since the method relies on the feedback nature of the boost control system, the feedback response may vary with the nature and magnitude of the pressure deviation that triggered the feedback response. In addition, there may be some pressure deviations even in un-faulted systems. Furthermore, pressure deviations may be affected by driver behavior. For example, strong accelerations may challenge the boost pressure regulation differently than mild driving. Likewise, a pressure overshoot deviation (where the desired boost pressure is lower than the current boost pressure) may have a different impact on the boost pressure regulation as compared to a pressure undershoot deviation (where the desired boost pressure is higher than the current pressure). As another example, boost pressure degradation due to a slowed VGT fault, may not be revealed by observing boost pressure if the VGT is never tasked to provide boost pressure correction. On the other hand, a severe vehicle acceleration on an un-faulted system might produce a sizable pressure deviation compared to a faulted system experiencing only a mild acceleration. Therefore, the challenge for the OBD test is to capture some aspect of the control response and pressure deviation that separates faulted response from un-faulted where a simple check of magnitude of deviation will not suffice.

In one example, boost pressure deviations are only valid monitor conditions when outside an upper limit or a lower limit. That is, boost pressure deviations that are higher than the upper limit and lower than the lower limit may be used for OBD testing of the boost pressure control system. The upper and lower limit may define upper and lower boundaries in which the response time of a pressure deviation may not be reliably correlated with boost pressure control degradation. In particular, a positive pressure deviation indicates that the system is suffering error by undershooting the desired value while negative pressure deviation indicates that the system is encountering error by overshooting the desired value. The necessary boundary levels are intended to create an error large enough to force the closed loop control to make a large correction that will test the available response capability of the system. Too small an error will illicit much milder corrections that a faulted slow response system may adequately respond to. By limiting the diagnostic to pressure deviations that lie outside the upper and lower limit, differences in response time to boost pressure undershoot relative to boost pressure overshoot may be accounted for during the determination of a fault. In particular, by placing the boundaries, the controller examines only strong control responses where the boost response speed matters and is able to more reliably produce clear demarcations between relevant and irrelevant deviation.

In one example, the controller may collect data over multiple drive cycle and road drives with both faulted and un-faulted conditions and refine the boundaries based on the data to get a solution. However, analysis of the control loop (made up of the controller electronics and actual physical parts) and the control algorithm can help. For example if a PI controller tuning and any dead-band error processing is used, it may be possible to see at what error level the controller action for smaller errors becomes very cautious and will only slowly close in on target, a mode of operation that would not reveal a slow response system.

If the result of 210 is false, that is the deviation is in the nominal range between the upper limit and the lower limit, then the deviation timer is reset at 212 and this path of the method is determined to be done until the next PCM pass. If the deviation lies outside the nominal range, the method continues to 214, where the deviation timer is allowed to advance for this PCM pass. At 216 this advanced deviation timer is checked against the previous timer value, and if larger, the controller replaces the last value at 218 with the most recently acquired value. If not larger, then at 220, the controller does not replace the last value since it is still the highest seen. In this way, for a given drive, the highest level the timer has reached is captured, even if the deviation timer has been reset and vehicle conditions require a new attempt to build up deviation time. This logged value of the deviation timer last is compared to a deviation threshold time at 222. If the threshold is not yet attained, then this path is considered completed until the next pass. The deviation timer is not reset here, rather on the next pass it may be reset by 202 through 216 based on changing conditions or it may continue to increase the logged deviation if fault conditions persist. If the deviation threshold is attained, then the method at 224 indicates that a slow boost response fault is present on this drive. At this point the method is complete, since a fault has been found, even if more testing time is allowed (as elaborated at 234). FIG. 2A at 224 shows the end of the monitor as optional here, in case some other system wishes to see further examples of faulted behavior (such as during vehicle pre-production development or scan tool debugging when the vehicle is being repaired).

The monitor then continues to 238 where the fault is assessed along with the confirmation of sufficient test time having elapsed. The test time confirming part of the monitor is elaborated at FIG. 2B at steps 226-236.

The path starting at 226 and its subsequent steps must execute as far as possible as well, similar to the path covered at steps 204-224. The 226 path must determine if adequate vehicle stimulus has occurred during the drive so that if a fault had existed, it would have been revealed sufficiently to be found by the path 208 through 224. Step 226 includes using the fuel mass injected value retrieved from the PCM to calculate a rate of change of this variable using standard first order derivative type of determination. At 228, the rate of change of the mass injection is checked against a threshold that if exceeded indicates that there is enough disturbance to the boost control that a faulted system will respond too slowly based on pressure deviation. If the mass injection rate is too small, then step 230 ends this PCM pass for updating the check timer, otherwise step 232 advances a timer when the conditions are adequate for fault detection. At 234, the check timer is compared against a maximum allowed time when adequate conditions existed to check for a fault. If there is still allowed time left, the method is allowed to keep monitoring more PCM passes, but if the allowed time is exceeded, then the method continues to 236, where the method alerts the rest of PCM that the allowed time has completed. At 238, if 224 has not detected a threshold level deviation time during the drive and 236 has declared test completion, then the method concludes that this drive has no fault present. At this point the method at 240 must halt until the PCM's OBD executive allows further operation (typically the next drive), usually resetting all the state conditions of the method.

It is possible that a fault could be revealed by a system disturbance that is not rooted in mass injection change, and the 208 to 224 portion of the method will still detect the slow response, which is desirable. However for purposes of declaring a no fault condition, the method is forced to use a known stimulus of revealing slow response for the purposes of checking for adequate conditions to reveal a fault. Typically a faulted system on most qualified drives will be revealed before the allowed time to test is exhausted, but the allowed time check is intended to make sure a no-fault declaration is justified. As a result, the likelihood of incorrect fault detections is reduced.

FIG. 3 details block 208 from FIG. 2A. Method 300 depicts an example method for determining the pressure deviation used in the monitoring method 200 of FIGS. 2A-2B. Step 302 includes retrieving the PCM calculated desired boost pressure from the controller's memory. The desired boost pressure is a diesel engine calculation that is based on operator torque demand that is primarily inferred from pedal position, but also many sub-system adjustments needed to satisfy smooth operation, fuel economy, and emissions, exemplified by creating conditions necessary to allow for correct EGR flow. The boost pressure is subject to mass flow, engine speed, and VGT (or waste gate) operation, but the PCM has limited freedom to adjust engine speed (via gear choice, converter slip) and mass injection (fuel rail pressure and injector timing) because the satisfying operator demand must always come first, so the PCM must primarily rely on the VGT to achieve desired boost pressure. As stated earlier, that while the VGT plays an important role in boost control, and may be a favored way of demonstrating the monitor, other causes can introduce slow response. The method described herein uses desired boost pressure as an input and does not reference the VGT command or its measured position, since the method should be able to find a slow response whether or not the VGT is the root cause. In this way, the method enables a slow boost response to be identified independent of a direction and magnitude of waste gate or VGT actuator adjustments used during the boost pressure control.

At 304 the desired boost pressure is processed by passing the signal through a delay and then through a lag filter that is governed by a time constant (TC) parameter. The resulting signal is an expected boost pressure that should exist if the system has normal (un-faulted) response. In one example, the delay and lag filter are fixed delay and fixed lag filters. At step 306, the PCM's value of the actual boost pressure is assigned to the actual value the method uses. This step allows for trivially using a simple measured sensor value but in some systems, the PCM may have to construct a representative signal from several sensors, or may offer slightly different measurement based signals that have been processed differently to eliminate noise at different frequencies, so the method should pick the most appropriate actual pressure available. Step 308 then subtracts actual from the expected to get a pressure deviation to pass on to 210 in FIG. 2A.

The intention of 304 is to adequately estimate what a normal boost response should be without resorting to elaborate on-line dynamic models that exceed resources to tune and execute on a PCM. The method may be satisfied with using a simple fixed set of choices of pure delay (one example is shown in FIG. 4 which has a delay of 0.4 seconds) and lag filter time constant (TC) (the example shown in FIG. 4 has a TC of 0.5 seconds). Some further refinement in matching nominal actual boost pressure is possible by making the delay and TC functions of other engine conditions such as speed and mass injection, but this adds to further complexity and therefore may be avoided in one example. In one example, the processing of the desired boost pressure, via the fixed delay and fixed time constant lag filter allows the controller to be able to anticipate, in a compact manner, what the measured boost pressure should look like for an un-faulted boost control system. When the actual boost pressure is compared to this value, a faulted case should show a large difference that is easily detected and flagged. As such, the feedback control of the boost pressure may be limited in its ability to reject disturbances due to the relatively long loop time of the overall system, primarily hindered by the presence of pure delay as well as some lagging dynamic response. Pure delay limits the feedback controller from taking immediate action to reject disturbances because there is no indication that an error has occurred until the delay passes, while in the meantime, the actual system boost pressure may be deviating from the target pressure. Once the error starts to reach the pressure sensor providing feedback to the boost pressure control system, which may be muted by the lagging dynamics, the controller can start to remedy the situation, although the full extent of the disturbance may not be sensed until the lag subsides. To some extent feedback controllers can be augmented to cope with known delay and lag conditions, but pure delay will always limit the feedback control ability to completely suppress a disturbance. The inventors herein have recognized that if unhindered by a fault, the closed-loop response of the boost control system to the desired boost pressure may resemble an open-loop response with a delay and a lag. Therefore, by processing the desired boost pressure via the delay and the lag filter, the need to model the boost pressure response based on many engine and VGT signals is reduced. As a result, significant reduction in computation cost and complexity is achieved while providing a sufficient approximation. It will be appreciated that in alternate examples, the lag and delay parameters may be variable instead of being fixed, the parameters varied based on one or more engine parameters. However, the reliance on variable lag and delay parameters may increase the computation cost and complexity of the measurement. Therefore, by relying on fixed lag and delay parameters, a balance between accuracy and complexity is achieved.

As elaborated with reference to FIG. 4, an un-faulted actual boost pressure can still overshoot or undershoot the expected boost pressure in selected engine operating regions. Therefore, by constraining the diagnostic test to not be applied during such conditions, a slow boost response is not incorrectly correlated with boost control degradation.

In this way, a controller may monitor response time of a boost pressure control system to selected boost pressure deviations triggered by an operator, without referencing commanded or measured waste-gate position; and responsive to the monitored response time being higher than a threshold while qualifying vehicle operating conditions are met, indicating degradation of the boost pressure control system and satisfying OBD test requirements. In one example, the desired boost pressure is processed via a delay and lagging filter using a time constant. A boost pressure deviation is calculated from the processed desired minus the measured or actual pressure. In one example, the selected boost pressure deviation may include boost pressure deviations that lie outside an upper lower limit. In one example, the upper limit is based on a set level of tolerated undershoot and the lower limit is based on a tolerated level of overshoot, beyond which create strong control corrections. The qualifying vehicle operating conditions may include a minimum vehicle run time, a threshold engine temperature, and a minimum manifold pressure level. The controller may include further instructions for, responsive to the qualifying vehicle operating conditions sufficient to reveal a potential fault, where a check timer advances when the vehicle's conditions of run time, minimum engine temperature and intake pressure and a minimum mass injection level exist. In a further example, responsive to the monitored response time being lower than the threshold, the controller may update the monitored response time in a memory of the engine controller and indicate no degradation of the boost pressure control system. In one example, indicating degradation responsive to the monitored response time includes indicating referencing the magnitude of the selected boost pressure deviations once outside an upper or lower boundary, and without referencing of the commanded or measured waste-gate position.

An example of variations in response time during closed loop boost pressure control in an un-faulted boost pressure control system is shown with reference to map 400 of FIG. 4. A desired boost pressure (Pdes) is shown at plot 406 (dashed line with small dashes). The processed desired boost pressure (expected), as processed via a delay and a lag filter, is shown at plot 404 (dashed line with long dashes). An actual boost pressure, as measured by a pressure sensor, is shown at plot 402 (solid line). Pressure is shown along the y-axis, and time along the x-axis. As depicted at traces 402 and 404, the expected boost pressure matches the actual boost pressure over most of the drive cycle.

In some places the plots 402 and 404 do not overlay and these are conditions where the method of FIGS. 2A-2B is limited to reduce erroneous interpretation of the results. For example, at region 410, when the engine is operating at idling conditions, the actual boost pressure (402) is slower to response to the commanded change in boost pressure than during non-idling conditions. Therefore in this region, plots 402 and 404 do not overlay well. As another example, during selected tip-ins and tip-outs, such as shown at region 420, the actual boost pressure undergoes some brief overshoots and undershoots, even though the system is not faulted. Further still, in some engine operating conditions, such as at region 430, the actual boost pressure (402) may be subject to disturbances that the controller is slow to reject. In regions 410, the vehicle is in a minimal operating state with an even longer lagging behavior, which can be avoided by checking the static boost pressure (in 204 of FIG. 2A). In region 420 the actual boost pressure oscillates slightly and these brief small over and undershoot deviations are blocked by checking the upper and lower bounds (in 210 of FIG. 2A). Region 430 is also blocked by the minimum pressure check (in 204 of FIG. 2A).

Figure 5:
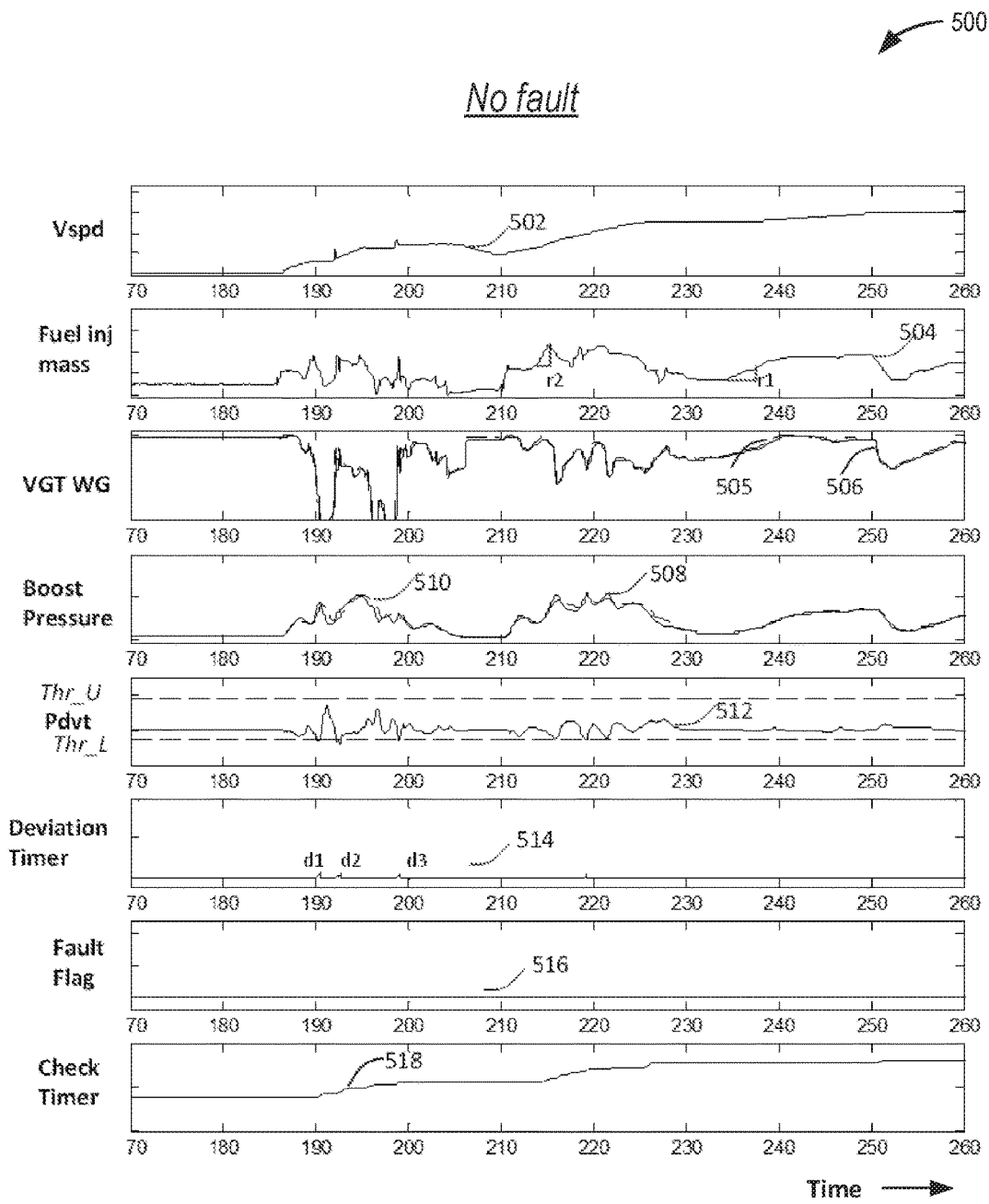
FIGS. 5 and 6 depict an un-faulted and faulted examples of boost pressure control diagnosis based on feedback control response time.

An example boost pressure control diagnostic with no fault is now shown at map 500 of FIG. 5. Map 500 depicts changes in vehicle speed (Vspd) at plot 502. As such, the changes in vehicle speed are reflective of the change in operator torque demand, the torque demand increased by an operator applying an accelerator pedal to increase the vehicle speed, the torque demand decreased by the operator applying a brake pedal and/or releasing the accelerator pedal to decrease the vehicle speed. Fuel injection mass responsive to the change in torque demand is shown at plot 504. VGT Waste-gate (WG) adjustments are depicted at plots 505 (desired) and 506 (measured) where for a no fault example overlay very closely. In particular, plot 506 shows a degree of WG opening, the WG opening increasing going from top to bottom of the y-axis, relieving boost pressure. Boost pressure changes are shown at plots 508-510 with plot 510 (dashed line) depicting the expected and plot 508 (solid line) depicting the actual boost pressure. The boost pressure deviation (Pdvt, determined as a difference between the desired delayed and filtered boost pressure and actual boost pressure) is shown at plot 512 in relation to an upper limit (Thr_U) and a lower limit (Thr_L). The output of a timer measuring a feedback control boost response time is shown at 514. A flag indicating boost control system degradation is shown at plot 516. All plots are shown over time along the x-axis. Deviation event markers d1-d3 represents points of significance. In FIG. 5, the deviation events are very small amounts of time that are below a deviation fault level, so the fault flag 516 remains at 0.

Figure 6:
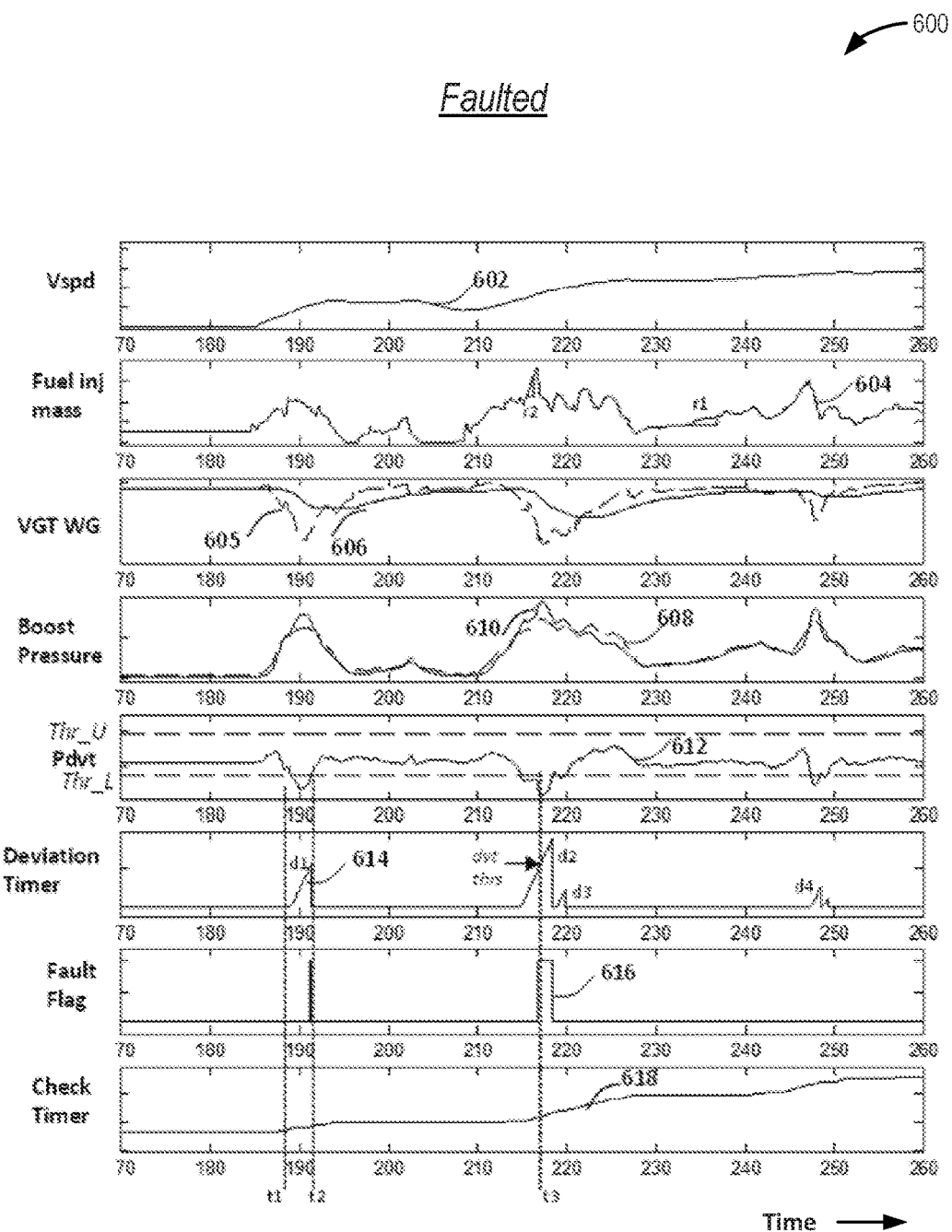

An example boost pressure control diagnostic with fault is now shown at map 600 of FIG. 6. Map 600 of FIG. 6 is an equivalent map to FIG. 5 (with all the same parameters labeled in the same way), except that a slow response fault is induced, in this example by deliberately slowing the VGT down by a lag filter with a TC of 5 seconds. Each plot is equivalent to FIG. 5, but labeled as a 600 vs. 500 number. In the example, as operator torque demand changes (604), the desired VGT WG (605) attempts to adjust, and the desired boost pressure (608) changes. Waste-gate adjustments are commanded to bring the actual boost pressure to the desired boost pressure. The waste-gate adjustments are commanded by a feedback control loop of the engine controller, the adjustments commanded responsive to a magnitude of a pressure error between the actual and desired boost pressure (not shown). If the pressure deviation (expected—actual) exceeds a range defined by the upper and lower limits, and if other qualifying vehicle operating conditions are met, the method monitors a time taken by the feedback control loop to bring the actual boost pressure to the desired delayed and filtered boost pressure level. The controller repeats this multiple times on a drive cycle, each time an opportunity arises, to learn an instance of response time of the feedback loop to a pressure deviation. If the response time for a boost event exceeds the allowed fault level response time for the vehicle model, degradation of the boost response time is indicated (616) and slow boost response is attributed to the degradation.

For example, at t1, after a rapid increase in torque demand necessitating a rapid increase in fuel injection mass, responsive to the torque demand, the VGT waste-gate opened to relieve boost pressure. However, for this faulted example, the VGT WG was too slow to fully contain the boost pressure rise and the pressure deviation exceeded the defined range (between Thr_U and Thr_L) and a duration d1 is determined to be the boost response time, between times t1 and t2 (where the pressure deviation returned inside the Thr_L boundary). The flag fault 616 does not indicate a fault until the d1 time reaches a fault level threshold, which is a short duration for event d1, but enough to indicate a fault condition. The event d2 is an even larger deviation example that runs the deviation timer up higher, clearly past the allowed fault level, which occurs at time t3.

The last plot of FIG. 6 (plot 618) shows the check timer, which tracks how long conditions existed during the drive where a fault would be detectable. The plot 618 only increases when a number of conditions are satisfied at 204, but most importantly condition 228 must be satisfied as well. In plot 604, the rate of change of the fuel mass is marked by r2, a sharp slope, and r1, a shallow slope. Plot 618 requires a sharp slope of 604 to advance the check timer. Note that the r1 shallow slope occurs when there is still some VGT WG lag in evidence but it is minor. The plots 608 and 610 overlay thus at this time the 612 deviation is easily contained in the Thr_U and Thr_L boundaries. The check timer 618 plot for the faulted case corresponds fairly well with large pressure deviations, thus can be used as an indicator that the method can distinguish when a fault is possible since the check timer advances equivalently for both FIG. 5 at 518 (no fault) and FIG. 6. At 618 (faulted).

The flag in plots 516 and 616 is shown to demonstrate when the method detects a fault. Once a fault is found the method communicates this to the PCM's OBD diagnostic routines that follow a regulatory procedure of establishing a malfunction indicator light activation, communicating with diagnostic service tools, updating a rate of usage monitor for the various OBD tests, etc. For a given drive, there is no further need for the method to continue to execute for OBD purposes, although further operation might be of some benefit for other functions, and in this example, even though a fault is found at t2, we continued to operate to show that the method will keep finding more faults as the drive continues Thus, the method is not used to check a boost system component, but rather to diagnose an overall system degradation. While the above example uses the VGT and WG as an example, this was merely used to demonstrate a fault. It will be appreciated that other system component issues, such as a leak, an incorrectly installed intake manifold, etc., could potentially can cause the same slow response. In one example, following detection of a slow boost response based on the completion of the above-described monitor, the controller may initiate another, different monitor to identify a source of the slow boost response, wherein a component responsible for the slow boost response is identified (and differentiated from other boost response actuators) and mitigating actions can then be performed based on the identified source of the slow boost response.

In this way, the response time of a closed loop boost control system to a pressure deviation may be used to non-intrusively diagnose boost degradation. By correlating boost control degradation with a slow boost response, without referencing the command or the position of the boost actuators (such as of a VGT waste-gate), slow response boost pressure may be diagnosed accurately and reliably. By measuring the response time of pressure deviations that lie outside a range defined by upper and lower boundaries, misdiagnoses (including falsely indicating that an un-faulted system is faulted, or that a faulted system is un-faulted) due to differences in boost response to boost pressure overshoot versus undershoot may be better accounted for. By diagnosing based on response time only when qualifying vehicle operating conditions are met, such as when not operating at or near idling conditions, the confidence factor of the results may be increased. By performing the test passively, vehicle drivability and emissions are not affected by the test. By comparing the response time of a qualified boost event to an empirically determined from a known un-faulted boost response time maximum for an exhaustive variety of drive conditions, boost degradation may be determined without relying on complex and computation intensive modeling. By diagnosing boost response degradation for qualified drives, regulatory requirements are satisfied and boost related issues may be timely addressed, to maintain expected drivability for the vehicle owner.

One example method for a boosted engine in a vehicle comprises: while operating an engine with closed-loop turbocharger boost control, indicating degradation of a boost pressure control system response based on a duration of a higher than threshold deviation between an expected change in boost pressure and actual change in boost pressure over a drive cycle, without referencing a variable geometry turbine (VGT) or waste-gate command or measurement. In the preceding example, additionally or optionally, the method further comprises monitoring vehicle operating conditions, and advancing a test timer of a boost response monitor when selected operating conditions that enable a slow boost response to be revealed if boost degradation is present are confirmed, the selected vehicle operating conditions including a rate of change of fuel injection mass being higher than a threshold rate. In any or all of the preceding examples, additionally or optionally, the method further comprises indicating completion of the boost response monitor responsive to one of the indication of degradation and a threshold time having elapsed on the test timer. In any or all of the preceding examples, additionally or optionally, the engine is operated with closed-loop boost control at non-idling conditions including each of a threshold vehicle run time having elapsed, a threshold engine temperature being reached, and a threshold intake manifold pressure being maintained. In any or all of the preceding examples, additionally or optionally, the indicating includes indicating degradation responsive to the duration being higher than a threshold duration, the indicating independent of the waste-gate command even as the waste-gate command changes over the drive cycle to reject boost pressure disturbances. In any or all of the preceding examples, additionally or optionally, the higher than threshold deviation includes a difference between the expected boost pressure and the actual boost pressure lying outside of a range defined by an upper limit and a lower limit, the upper limit based on tolerance of undershoot allowed for a nominal boost control system, the lower limit based on tolerance of overshoot allowed for the nominal boost control system. In any or all of the preceding examples, additionally or optionally, the method further comprises, responsive to the indicating, adjusting one or more engine operating parameters to increase throttle inlet pressure, the one or more engine operating parameters including an intake throttle position, a VGT position, and a waste gate position. In any or all of the preceding examples, additionally or optionally, the method further comprises estimating a deviation between the expected change in boost pressure and actual change in boost pressure, the estimating including estimating a target boost pressure based on the operator torque demand; processing the target boost pressure via each of a fixed delay and a fixed lag filter parameter of the boost pressure control system; and calculating the deviation as a difference between the processed target boost pressure and a measured boost pressure.

Another example method comprises monitoring response time of a boost pressure control system to selected boost pressure deviations triggered by an operator, independent of referencing a commanded or measured waste-gate position; and responsive to the monitored response time being higher than a threshold duration while qualifying vehicle operating conditions are met, indicating degradation of the boost pressure control system. In the preceding example, additionally or optionally, the selected boost pressure deviations include boost pressure deviations between an expected boost pressure and an actual boost pressure that are larger than an upper limit or lower than a lower limit. In any or all of the preceding examples, additionally or optionally, the selected boost pressure deviations are based on the expected boost pressure that is calculated from the desired boost pressure upon processing via a fixed delay and a fixed parameter time constant lag filter. In any or all of the preceding examples, additionally or optionally, the upper limit is based on tolerance of undershoot allowed for a nominal boost pressure control system and the lower limit is based on tolerance of overshoot allowed for the nominal boost pressure control system. In any or all of the preceding examples, additionally or optionally, the qualifying vehicle operating conditions include a minimum vehicle run time, a threshold engine temperature, and a minimum manifold pressure level. In any or all of the preceding examples, additionally or optionally, the method further comprises, responsive to the qualifying vehicle operating conditions not being met, continuing to monitor the response time until either degradation is indicated or a qualified observation time has expired. In any or all of the preceding examples, additionally or optionally, the method further comprises, responsive to the monitored response time being lower than the threshold duration, updating the monitored response time in a memory of an engine controller and indicating no degradation of the boost pressure control system. In any or all of the preceding examples, additionally or optionally, indicating degradation responsive to the monitored response time includes indicating degradation independent of a magnitude of the selected boost pressure deviations once the threshold duration is elapsed, and independent of referencing the commanded or measured waste-gate position.

Another example vehicle system comprises: an engine; a turbocharger including an intake compressor driven by an exhaust turbine; a waste-gate valve positioned in a waste-gate coupled across the exhaust turbine; a timer; and a controller with computer-readable instructions stored on non-transitory memory for: responsive to a change in demanded boost pressure and feedback detected disturbances, adjusting a position of the waste-gate valve and initiating the timer; monitoring a duration elapsed on the timer to complete a pressure deviation correction corresponding to demanded difference between expected and actual boost pressure following the adjusting. In any or all of the preceding examples, additionally or optionally, the controller includes further instructions for monitoring the duration responsive to qualifying vehicle operating conditions being met including a minimum vehicle run time, a threshold engine temperature estimated via an engine temperature sensor, and a minimum manifold pressure level estimated by an intake manifold pressure sensor. In any or all of the preceding examples, additionally or optionally, the controller includes further instructions for: responsive to the qualifying vehicle operating conditions not being met, continuing the monitoring until either degradation is indicated or an allowed observation time is exceeded. In any or all of the preceding examples, additionally or optionally, the controller includes further instructions for processing desired boost pressure to form the expected pressure via a delay and a time constant parameter lag filter with a time constant parameter; and calculating a boost pressure deviation as a difference of the expected boost pressure and actual boost pressure, wherein the indicating includes indicating degradation when the boost pressure deviation lies outside a range formed by an upper limit and a lower limit, the upper limit based on tolerance of undershoot allowed for a nominal system, the lower limit based on tolerance of overshoot allowed for a nominal system.

In a further representation, a method for a turbocharged engine comprises: over a drive cycle, estimating a current pressure deviation between actual boost pressure and expected boost pressure; responsive to the current pressure deviation being higher than a threshold level, monitoring a duration over which the current pressure deviation remains higher than the threshold level, and comparing the monitored duration to the duration of a last higher than threshold pressure deviation of the drive cycle. In response to each of the monitored duration of the current higher than threshold pressure deviation being larger than the monitored duration of the last higher than threshold pressure deviation of the drive cycle, and the monitored duration of the current higher than threshold pressure deviation being larger than a threshold duration, indicating degraded response time (or slow boost response) of a boost control system coupled to the turbocharged engine. In a further representation, additionally or optionally, the current pressure deviation being higher than a threshold level includes the current pressure deviation being higher than an upper deviation limit or lower than a lower deviation limit. In a further representation, additionally or optionally, monitoring the duration includes starting or advancing a deviation timer in response to the current pressure deviation being higher than the threshold level. In a further representation, additionally or optionally, if the monitored duration of the current higher than threshold pressure deviation is smaller than the monitored duration of the last higher than threshold pressure deviation, resetting the deviation timer and not storing the monitored duration of the current higher than threshold pressure deviation in a memory of the engine controller, while maintaining the monitored duration of the last higher than threshold pressure deviation in the memory of the engine controller. In a further representation, the estimating the current pressure deviation between actual boost pressure and expected boost pressure is responsive to qualifying vehicle operating conditions being met, the qualifying vehicle operating conditions including a minimum vehicle run time, a threshold engine temperature, and a minimum manifold pressure level. In a further representation, the actual boost pressure is inferred based on a throttle inlet pressure, and the expected boost pressure is estimated by processing a commanded boost pressure, the commanded boost pressure based on operator torque demand. In a further representation, the turbocharged engine includes a turbocharger having an exhaust turbine and a waste gate coupled to the turbine, the turbine including a variable geometry turbine (VGT), wherein the method further comprises, commanding a VGT and/or waste gate based on the operator torque demand to reduce a difference between actual boost pressure and commanded boost pressure, and wherein the indicating of a degraded response time is performed independent of the commanded VGT and/or waste gate position. In a further representation, responsive to the qualifying vehicle operating conditions being met and a calculate rate of change of fuel injection mass being higher than a threshold, starting or advancing a check timer, different from the deviation timer, continuing to advance the check timer until one of a qualified test time has elapsed on the check timer and the monitored duration of the current higher than threshold pressure deviation is larger than the threshold duration, then indicating that a test time is complete and resetting the check timer. In a further representation, responsive to the monitored duration of the current higher than threshold pressure deviation being smaller than the threshold duration and the test time on the check timer being completed, indicating no degradation of boost response time.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A diagnostic method for a boosted engine in a vehicle, comprising:
   entering a diagnostic monitor and adjusting an actuator while operating an engine with closed-loop turbocharger boost control via a controller, and providing an indication of degradation via the controller based on a duration of an actual deviation being higher than a threshold deviation between an expected change in boost pressure and an actual change in boost pressure over a drive cycle, without referencing a variable geometry turbine (VGT) or waste-gate command or measurement,
   wherein the engine is operated with closed-loop turbocharger boost control at non-idling conditions via the controller including each of a threshold vehicle run time having elapsed, a threshold engine temperature being reached, and a threshold intake manifold pressure being maintained.

2. The diagnostic method of claim 1, further comprising monitoring vehicle operating conditions and advancing a test timer of a boost response monitor when selected operating conditions that enable a slow boost response to be revealed if boost degradation is present are confirmed via the controller, the selected operating conditions including a rate of change of fuel injection mass being higher than a threshold rate.

3. The diagnostic method of claim 2, further comprising indicating completion of the boost response monitor responsive to one of the indication of degradation and a threshold time having elapsed on the test timer.

4. The diagnostic method of claim 1, wherein the indication of degradation is in responsive to the duration being higher than a threshold duration.

5. The diagnostic method of claim 1, wherein the higher than threshold deviation includes a difference between the expected change in boost pressure and the actual boost pressure lying outside of a range defined by an upper limit and a lower limit, the upper limit based on tolerance of undershoot, and the lower limit based on tolerance of overshoot allowed for the nominal boost control system.

6. The diagnostic method of claim 1, further comprising, responsive to the indication, adjusting one or more engine operating parameters to increase throttle inlet pressure, the one or more engine operating parameters including an intake throttle position, a VGT position, and a waste-gate position.

7. The diagnostic method of claim 1, further comprising estimating a deviation between the expected change in boost pressure and the actual change in boost pressure, the estimating including:
   estimating a target boost pressure based on an operator torque demand;
   processing the target boost pressure via the controller and each of a fixed delay and a fixed lag filter parameter; and
   calculating the deviation as a difference between the processed target boost pressure and a measured boost pressure.

8. A diagnostic method for a boosted engine in a vehicle, comprising:
   via a controller, entering a diagnostic monitor, adjusting an actuator, and monitoring a response time to selected boost pressure deviations triggered by an operator, independent of referencing a commanded or measured waste-gate position; and
   responsive to the monitored response time being longer than a threshold duration while qualifying vehicle operating conditions are met, generating an indication of degradation via the controller,
      wherein generating the indication of degradation responsive to the monitored response time includes indicating degradation independent of a magnitude of the selected boost pressure deviations once the threshold duration is elapsed, and independent of referencing the commanded or measured waste-gate position.

9. The diagnostic method of claim 8, wherein the selected boost pressure deviations include boost pressure deviations between an expected boost pressure and an actual boost pressure that are larger than an upper limit that is based on undershoot or lower than a lower limit that is based on overshoot.

10. The diagnostic method of claim 9, wherein the selected boost pressure deviations are based on the expected boost pressure that is calculated via the controller from the desired boost pressure.

11. The diagnostic method of claim 9, wherein the upper limit is based on tolerance of undershoot allowed for a nominal boost pressure control system and the lower limit is based on tolerance of overshoot.

12. The diagnostic method of claim 8, wherein the qualifying vehicle operating conditions include a minimum vehicle run time, a threshold engine temperature, and a minimum manifold pressure level.

13. The diagnostic method of claim 12, further comprising, responsive to the qualifying vehicle operating conditions not being met, continuing to monitor the response time until either degradation is indicated or a qualified observation time has expired.

14. The diagnostic method of claim 8, further comprising, responsive to the monitored response time being lower than the threshold duration, updating the monitored response time in a memory of an engine controller and indicating no degradation.

15. A vehicle system, comprising:
   an engine;
   a turbocharger including an intake compressor driven by an exhaust turbine; a waste-gate valve positioned in a waste-gate coupled across the exhaust turbine;
   a timer; and
   a controller with computer-readable instructions stored on non-transitory memory for:
      responsive to a change in demanded boost pressure and feedback detected disturbances, adjusting a position of the waste-gate valve and initiating the timer;
      monitoring a duration elapsed on the timer to complete a pressure deviation correction corresponding to a demanded difference between an expected boost pressure and an actual boost pressure following the adjusting; and
      indicating degraded boost response time to a vehicle driver based on the monitored duration.

16. The system of claim 15, wherein the controller includes further instructions for:
   monitoring the duration responsive to qualifying vehicle operating conditions being met including a minimum vehicle run time, a threshold engine temperature estimated via an engine temperature sensor, and a minimum manifold pressure level estimated by an intake manifold pressure sensor.

17. The system of claim 16, wherein the controller includes further instructions for:
   responsive to the qualifying vehicle operating conditions not being met, continuing the monitoring until either degradation is indicated or an allowed observation time is exceeded.

18. The system of claim 15, wherein the controller includes further instructions for:
   calculating a boost pressure deviation as a difference of the expected boost pressure and the actual boost pressure;
   wherein the indicating includes indicating degradation when the boost pressure deviation lies outside a range formed by an upper limit and a lower limit, the upper limit based on tolerance of undershoot allowed for a nominal system, and the lower limit based on tolerance of overshoot allowed for the nominal system.

* * * * *